United States Patent [19]

Yoshioka

[11] Patent Number: 4,964,109
[45] Date of Patent: Oct. 16, 1990

[54] FAST SPEED REPRODUCTION SYSTEM FOR DIGITAL DISC

[75] Inventor: Yo Yoshioka, Kanagawa, Japan

[73] Assignee: Kabushiki Kaisha Toshiba, Kanagawa, Japan

[21] Appl. No.: 228,619

[22] Filed: Aug. 5, 1988

[30] Foreign Application Priority Data

Aug. 5, 1987 [JP] Japan ................................. 62-194294
Oct. 9, 1987 [JP] Japan ................................. 62-255001
Oct. 9, 1987 [JP] Japan ................................. 62-255002

[51] Int. Cl.$^5$ ............................................. G11B 7/00
[52] U.S. Cl. ................................... 369/44.11; 369/51; 360/51
[58] Field of Search ......................... 369/43–47, 369/59, 48, 44.11; 358/337, 338, 342, 335; 360/51, 8, 9.1, 10.1, 32, 33.1, 36.1, 36.2, 39, 27

[56] References Cited

U.S. PATENT DOCUMENTS 4,675,749  6/1987  Banno et al. .................... 358/342
4,780,772 10/1988  Shibuya et al. ...................  360/51

FOREIGN PATENT DOCUMENTS 0166785   1/1986  European Pat. Off. .
61-50256   3/1986  Japan .
61-162868  7/1986  Japan .
61-170961  8/1986  Japan .

Primary Examiner—Robert L. Richardson
Attorney, Agent, or Firm—Finnegan, Henderson, Farabow, Garrett, and Dunner

[57] ABSTRACT

A digital disc reproduction system including a disc reproducing mechanism section for driving a disc and reading the disc, a signal processing means for servo controlling the disc reproducing mechanism section and for processing signals obtained from the disc reproducing mechanism section, a clock generator means for generating a plurality of different frequency clocks and means for selectively supplying the different frequency clocks to the signal processing means.

6 Claims, 6 Drawing Sheets

FAST SPEED REPRODUCTION SYSTEM FOR DIGITAL DISC

FIELD OF THE INVENTION

The present invention relates generally to a digital disc reproduction system, and more particularly, to a fast speed reproduction system for a digital disc.

BACKGROUND OF THE INVENTION

Recently, digital discs have been widely used in many fields. For example, a CD (abbreviation of Compact Disc) is used for digital audio records. A CD-ROM (ROM; abbreviation of Read Only Memory) is used for data memories. An LV (abbreviation of Laser Vision) disc is used for video records. In those digital discs, recorded data or information are reproduced at a speed specified to each kind of the digital discs. Thus, reproduction apparatus of digital discs are designed to reproduce the digital discs at the sole reproduction speed, i.e., a standard speed specified to each of the digital discs.

Referring now to FIG. 1, an example is shown of the conventional reproduction system for digital discs, e.g., a CD dubbing system. The CD reproduction system is provided for carrying out a dubbing from CD players to analog tape recorders.

In FIG. 1, the CD reproduction system comprises a CD player 10 and an analog tape recorder, e.g., a cassette tape recorder 11. The CD player 10 includes a CD reproducing mechanism section 12, a clock generator 13 and a signal processor 14.

The CD reproducing mechanism section 12 comprises a disc drive motor 15, a disc turntable 16 and a pickup device 17. The clock generator 13 generates a clock pulse Pck with a prescribed frequency Fck. The clock pulse Pck is applied to the signal processor 14.

The signal processor 14 comprises a servo control section 14a and an information signal reproducing section 14b. The servo control section 14a is coupled to the disc drive motor 15 and the pickup device 17 for supplying servo control signals thereto, as described later in brief. The information signal reproducing section 14b is coupled to the pickup device 17 for receiving an RF signal (RF; abbreviation of Radio Frequency) Srf read from a CD 18 and sent to the CD reproducing mechanism section 14.

The disc drive motor 15 drives the disc turntable 16 under the servo control of the servo control section 14a. The pickup device 17 shifts in the radial direction of the CD 18 under the servo control of the servo control section 14a. Thus, the pickup device 17 traces a record track on the CD 18 in a CLV (Constant Linear Velocity) speed. The pickup device 17 reads the CD 18 during the tracing of the record track of the CD 18 so that an RF signal Srf corresponding to the digital data recorded on the CD 18 is output from the pickup device 17.

The pickup device 17 outputs the RF signal Srf corresponding to the digital data, as described above. The RF signal Srf is applied to the information signal reproducing section 14b of the signal processor 14. A data slice circuit (not shown) in the information signal reproducing section 14b slices the RF signal Srf at a prescribed threshold level so that the RF signal Srf is shaped to the original digital data.

The servo control section 14a of the signal processor 14 generates two servo control data SCm and SCp and a bit synchronizing signal BS from the reproduced digital data. A motor servo control data SCm is applied to the disc drive motor 15, as described before. A pickup servo control data SCp is applied to the pickup device 17, as described before. The servo controls for both the disc drive motor 15 and the pickup device 17 are carried out in using the digital data obtained from the output of the pickup device 17, i.e., the RF signal Srf, and also the clock pulse Pck applied from the clock generator 13.

The information signal reproducing section 14b of the signal processor 14 demodulates an analog data AD from the reproduced digital data under the control of the clock pulse Pck. The analog data AD is applied to the cassette tape recorder 11. The cassette tape recorder 11 then records the analog data AD.

The conventional reproduction apparatus of digital discs, however, have a drawback that a reproduction of the digital discs takes a relatively long time the same as a standard record time provided for each of the digital discs.

SUMMARY OF THE INVENTION

Accordingly, an object of the present invention is to provide a reproduction system for a digital disc which is able to reduce the time for reproducing the digital disc.

Another object of the present invention is to provide a reproduction system for a digital disc which is able to reproduce a digital disc with a good accuracy similar to the standard speed reproduction.

In order to achieve the above objects, the digital disc reproduction system according to the present invention includes a disc reproducing mechanism section for driving a disc and reading the disc, a signal processing means for servo controlling the disc reproducing mechanism section and for processing signals obtained from the disc reproducing mechanism section, a clock generator means for generating a plurality of different frequency clocks and means for selectively supplying the different frequency clocks to the signal processing means.

Additional objects and advantages of the present invention will be apparent to persons skilled in the art from a study of the following description and the accompanying drawings, which are hereby incorporated in and constitute a part of this specification.

DESCRIPTION OF THE PREFERRED EMBODIMENTS

Figure 1:
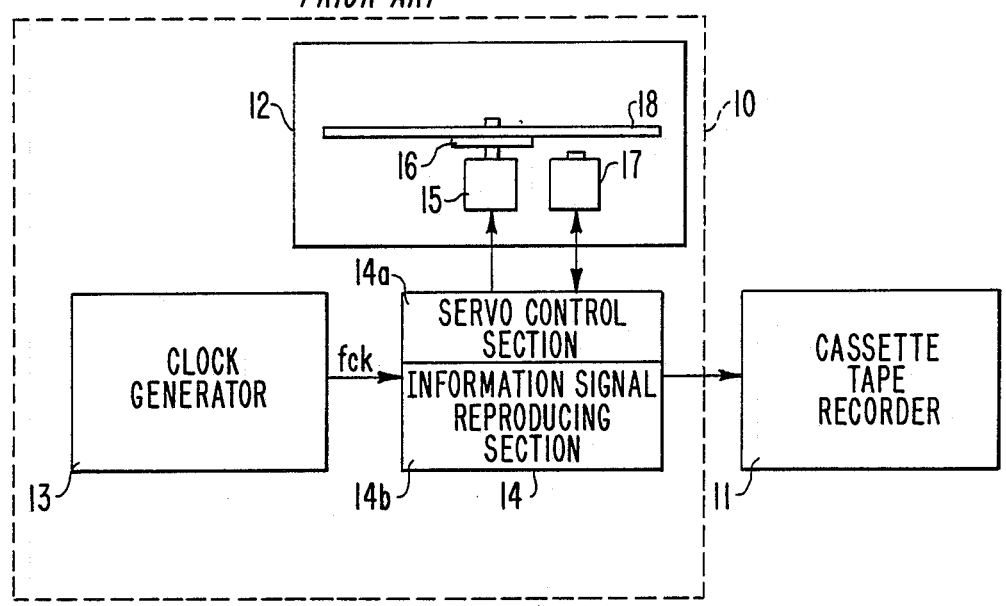
FIG. 1 is a block diagram showing a conventional reproduction system of digital discs, which is provided for dubbing from a CD player to a tape recorder.

The present invention will be described in detail with reference to the FIGS. 2 through 8. Throughout the drawings, reference numerals or letters used in FIG. 1 (Prior Art) will be used to designate like or equivalent elements for simplicity of explanation.

Figure 2:
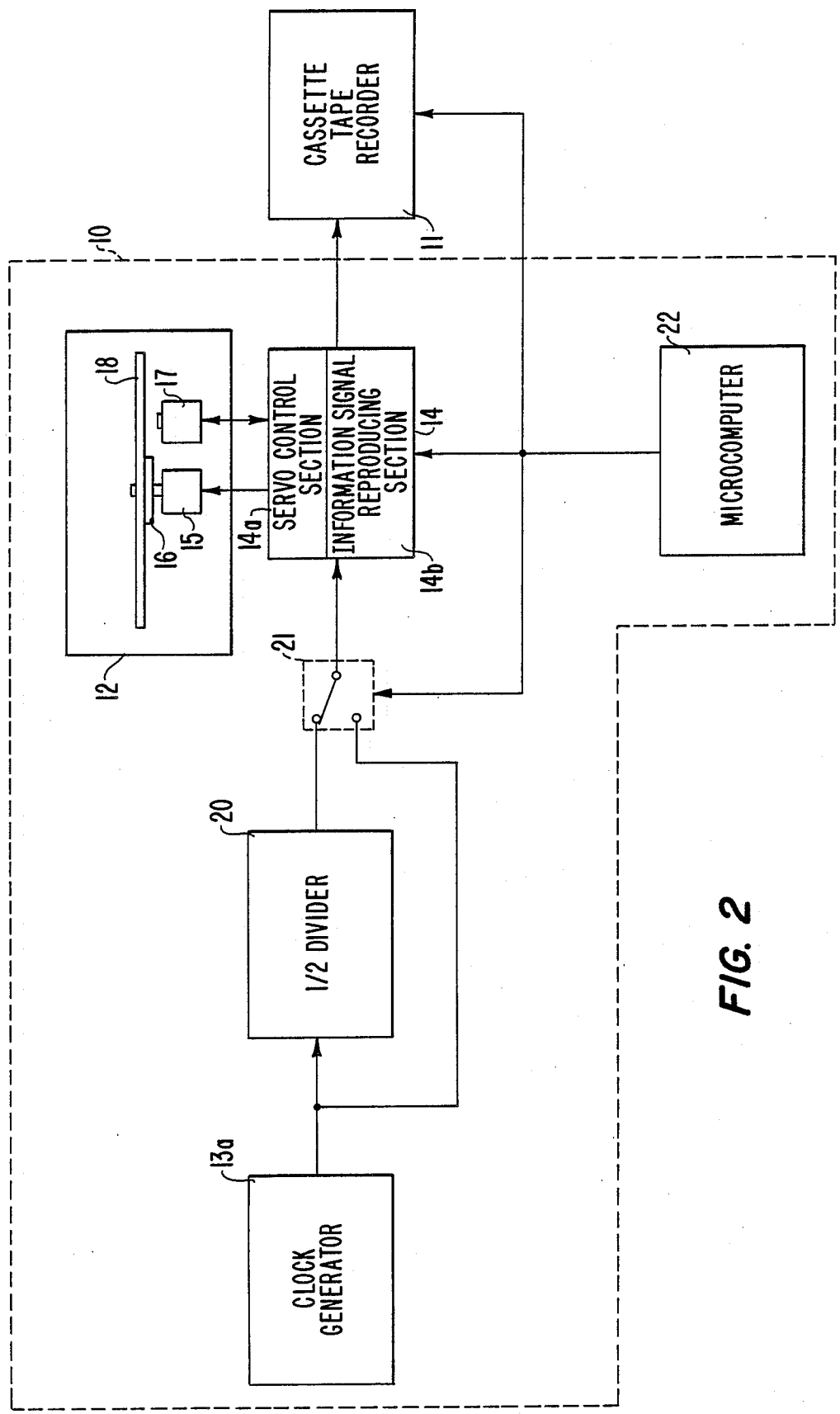
FIG. 2 is a block diagram showing a first embodiment of the reproduction system of digital discs according to the present invention, which is provided for dubbing from a CD player to a tape recorder.

Referring now to FIG. 2, a first embodiment of a digital disc reproduction systems, e.g., a CD dubbing system is shown. The CD reproduction system is provided for carrying out a dubbing from CD players to analog tape recorders.

In FIG. 2, the CD reproduction system comprises a CD player 10 and an analog tape recorder, e.g., a cassette tape recorder 11. The CD player 10 includes a CD reproducing mechanism section 12, a clock generator 13a, a signal processor 14, a ½ divider 20, a selector 21 and a microcomputer 22. The CD reproducing mechanism section 12 comprises a disc drive motor 15, a disc turntable 16 and a pickup device 17.

The clock generator 13a generates a first clock pulse Pck1. The first clock pulse Pck1 is applied to the ½ divider 20. The ½ divider 20 divides the frequency Fck1 of the first clock pulse Pck1 so that a frequency divided clock pulse, i.e., a second clock pulse Pck2 is output from the ½ divider 20. The first clock pulse Pck1 has a frequency Fck1 two times faster than the frequency Fck of the clock pulse Pck used in the conventional CD reproduction system (see FIG. 1). Thus, a frequency Fck2 of the second clock pulse Pck2 is the same as the frequency Fck of the clock pulse Pck used in the conventional CD reproduction system. The frequency Fck1 is represented by the equation:

$$Fck1 = 2 \cdot Fck2 = 2 \cdot Fck.$$

The first clock pulse Pck1 and the second clock pulse Pck2 are applied to the selector 21. The selector 21 selects one of the applied clock pulses Pck1 and Pck2 under the control of the microcomputer 22. For example, the microcomputer 22 supplies the selector 21 with a selection signal Sh of high level state or another selection signal S1 of low level state. The high level selection signal Sh and the low level selection signal S1 output from the microcomputer 22 are selected by a prescribed dubbing speed selection key (not shown) equipped to the CD player 10. When a standard speed dubbing mode is selected by the dubbing speed selection key, the microcomputor 22 outputs the low level selection signal S1. Thus, the selector 21 selects the second clock pulse Pck2 applied from the ½ divider 20. When a fast speed dubbing mode is selected by the dubbing speed selection key, the microcomputer 22 outputs the high level selection signal Sh. Thus, the selector 21 selects the first clock pulse Pck1 applied from the clock generator 13a.

A selected output, i.e., the first clock pulse Pck1 or the second clock pulse Pck2 of the selector 21 is applied to the signal processor 14. The signal processor 14 comprises a servo control section 14a and an information signal reproducing section 14b. The servo control section 14a is coupled to the disc drive motor 15 and the pickup device 17 for supplying servo control signals thereto, as described later in brief. The information signal reproducing section 14b is coupled to the pickup device 17 for receiving an RF signal Srf read from a CD 18 set to the CD reproducing mechanism section 12.

The disc drive motor 15 drives the CD 18 under the servo control of the servo control section 14a. The pickup device 17 shifts in the radial direction of the CD 18 under the servo control of the servo control section 14a. Thus, the pickup device 17 traces a record track on the CD 18 in the CLV speed, as described before. The pickup device 17 reads digital data recorded on the CD 18 during the tracing of the record track of the CD 18.

The pickup device 17 outputs the RF signal Srf corresponding to the digital data. The RF signal Srf is applied to the information signal reproducing section 14b of the signal processor 14. A data slice circuit (not shown) in the information signal reproducing section 14b slices the RF signal Srf at a prescribed threshold level so that the RF signal Srf is shaped to the original digital data.

The servo control section 14a of the signal processor 14 generates two servo control data SCm and SCp and a bit synchronizing signal BS from the reproduced digital data. A motor servo control data SCm is applied to the disc drive motor 15, as described before. A pickup servo control data SCp is applied to the pickup device 17, as described before. The servo controls for both the disc drive motor 15 and the pickup device 17 are carried out in using the digital data obtained from the output of the pickup device 17, i.e., the RF signal Srf, and also the selected clock pulse, i.e., the first clock pulse Pck1 or the second clock pulse Pck2 selectively applied from the clock generator 13a or the ½ divider 20 through the selector 21.

The selected output of the selector 21 is applied to the signal processor 14, as described above. When the second clock pulse Pck2 is output from the selector 21, the signal processor 14 operates in response to the frequency Fck2 of the second clock pulse Pck2. Thus, the servo control section 14a processes the motor servo control data SCm and the pickup servo control data SCp in response to the clock frequency Fck2. The information signal reproducing section 14b also processes the RF signal Srf in response to the clock frequency Fck2. As a result, the CD player 10 operates at the standard speed the same as the conventional reproducing system, as described before.

When the first clock pulse Pck1 is output from the selector 21, the signal processor 14 operates in response to the frequency Fck1 of the first clock pulse Pck1. Thus, the servo control section 14a processes the motor servo control data SCm and the pickup servo control data SCp in response to the clock frequency Fck1. The information signal reproducing section 14b also processes the RF signal Srf in response to the clock frequency Fck1. The frequency Fck1 is two times faster than the frequency Fck2 of the second clock pulse Pck2. As a result, the CD layer 10 operates at a fast speed two times faster than the conventional reproducing system.

The information signal reproducing section 14b of the signal processor 14 demodulates an analog data AD from the reproduced digital data under the control of the first clock pulse Pck1 or the second clock pulse Pck2. Thus a first analog signal AD1 processed in response to the first clock pulse Pck1 or a second analog signal AD2 processed in response to the second clock pulse Pck2 is selectively output from the CD player 10. The first analog signal AD1 has a frequency band two times wider than the frequency band of the second analog signal AD2, but the first analog signal AD1 is shorter by a half than the second analog signal AD2.

The microcomputer 22 is coupled to the cassette tape recorder 11. The cassette tape recorder 11 records signals applied from the CD player 10. Thus, a dubbing from the CD player 10 to the cassette tape recorder 11 is carried out. A tape speed of the cassette tape recorder 11 in the recording operation is controlled by the microcomputer 22 and interlocked with the selector 21. When the low level selection signal S1 is supplied form the microcomputer 22, the cassette tape recorder 11 carries out the recording at standard recording speed. When the high level selection signal Sh is supplied form the microcomputer 22, the cassette tape recorder 11 carries out the recording at a fast recording speed, two times faster than the standard recording speed. Thus, the CD dubbing system carries out the standard speed dubbing or the fast speed dubbing, in response to the low level selection signal S1 or the high level selection signal Sh supplied from the microcomputer 22.

Figure 3:
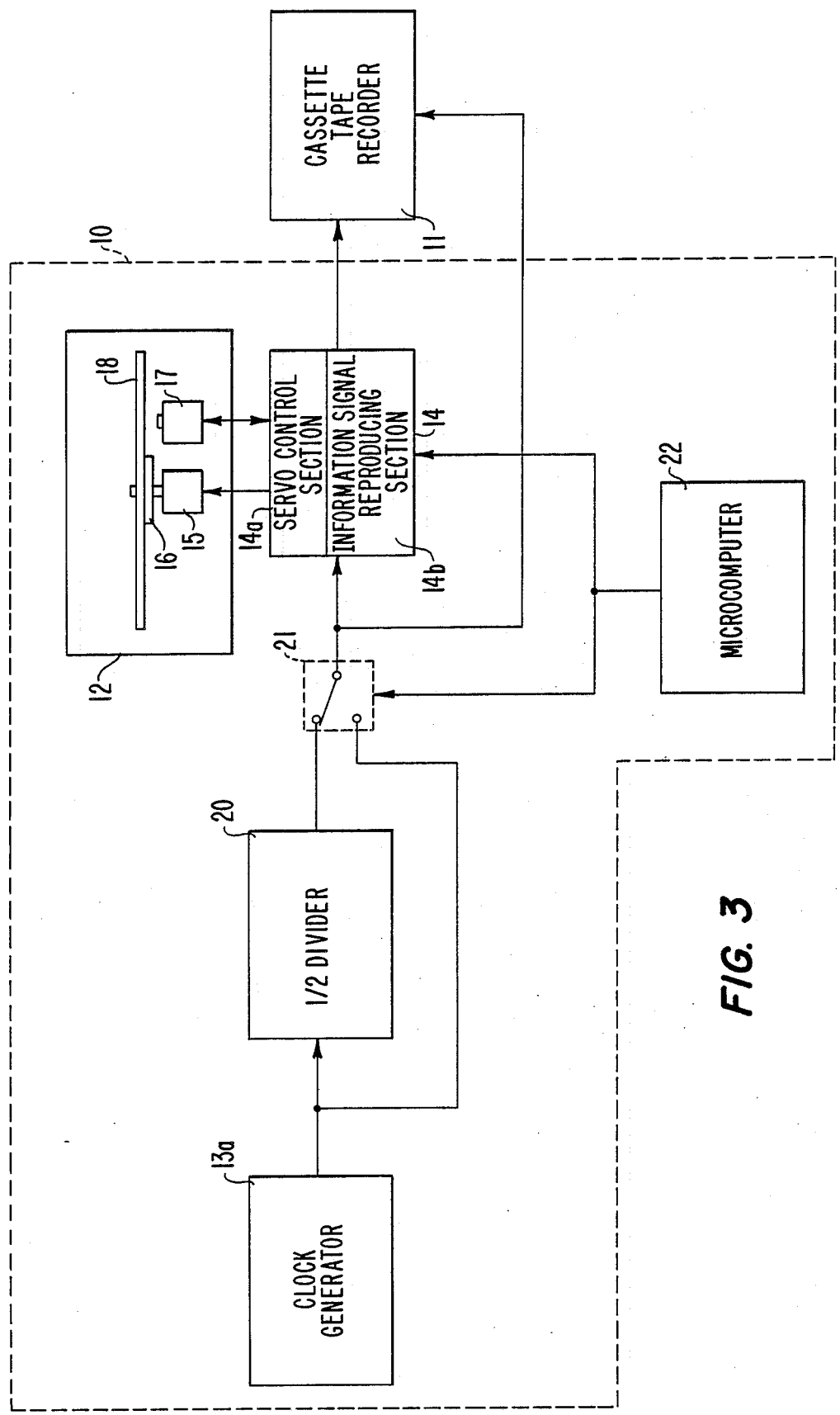
FIG. 3 is a block diagram showing a modification of the reproduction system of digital discs of FIG. 2.

Referring now to FIG. 3, a modification of the first embodiment of digital disc reproduction systems, e.g., the CD dubbing system will be described. The CD reproduction system is provided for carrying out a dubbing from CD players to analog tape recorders.

The CD reproduction system of FIG. 3 is different from the system of FIG. 2 in that the cassette tape recorder 11 is of the clock synchronous type. Clock synchronous type cassette tape recorders have their operation speed controlled in synchronism with a synchronous signal applied thereto.

In FIG. 3, a selected output of the selector 21, i.e., the first clock pulse Pck1 or the second clock pulse Pck2 is applied to the cassette tape recorder 11. Recording speed of the cassette tape recorder 11 varies in synchronism with the clock pulse Pck1 or Pck2. When the second clock pulse Pck2 is supplied from the selector 21, the cassette tape recorder 11 carries out the recording at the standard recording speed. When the first clock pulse Pck1 is supplied from the selector 21, the cassette tape recorder 11 carries out the recording at the fast recording speed, two times faster than the standard recording speed. Thus, the CD dubbing system carries out the standard speed dubbing or the fast speed dubbing, in response to the second clock pulse Pck2 or the first clock pulse Pck1 supplied from the selector 21.

Figure 4:
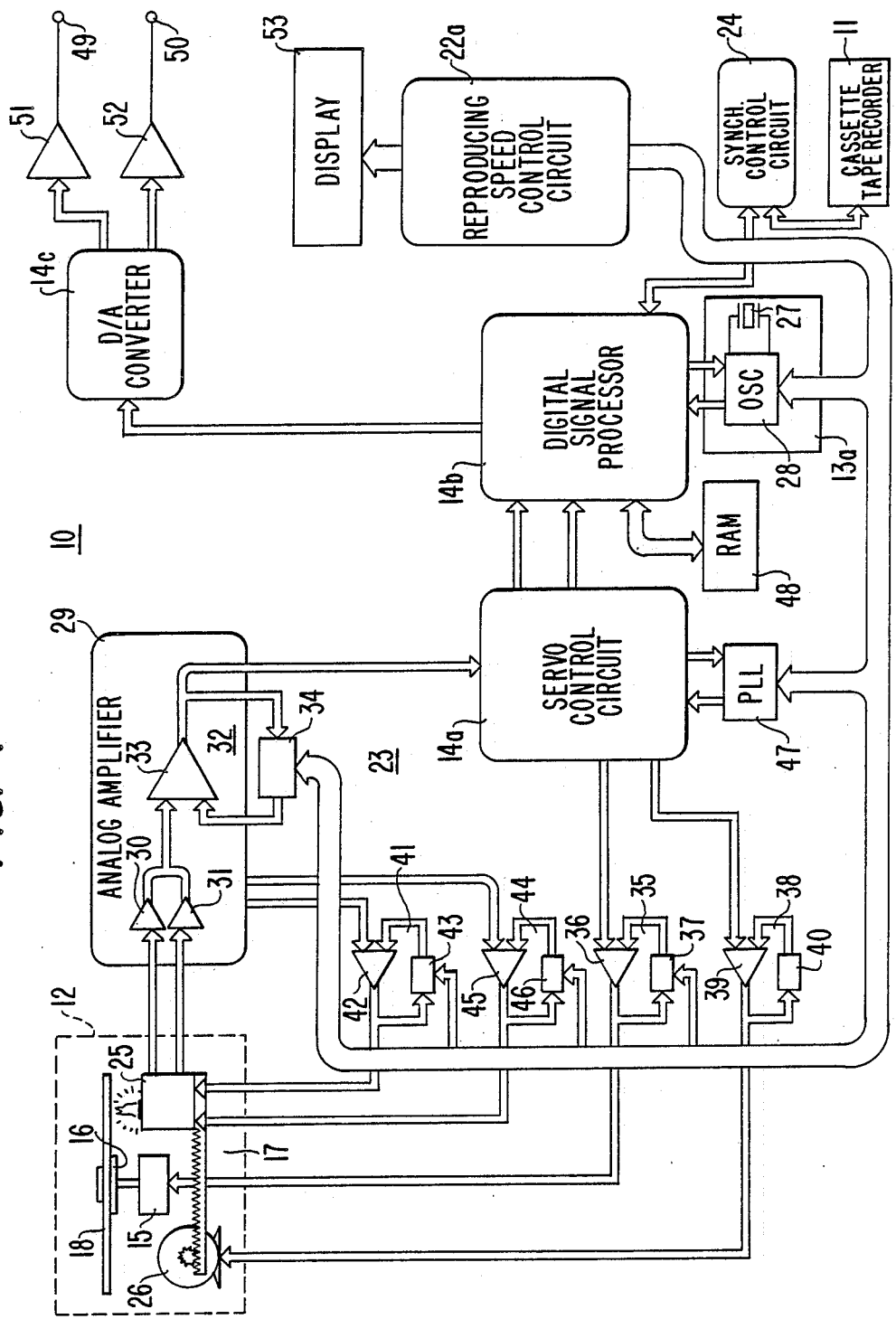
FIG. 4 is a block diagram showing a second embodiment of the reproduction system of digital discs according to the present invention, which is provided for dubbing from a CD player to a tape recorder.

Referring now to FIG. 4, a second embodiment of digital disc reproduction systems, e.g., the CD dubbing system.

In FIG. 4, the CD reproduction system comprises a CD player 10 and a cassette tape recorder 11. The CD player 10 principally includes a CD reproducing mechanism section 12, a pickup signal processing circuit 23, a clock generator 13a, a servo control circuit 14a, a digital signal processor 14b, a digital to analog conversion circuit (referred to as D/A conversion circuit hereafter) 14c, a reproducing speed control circuit 22a and a synchronous control circuit 24.

The CD reproducing mechanism section 12 comprises a disc drive motor 15, a disc turntable 16 and a pickup device 17. The pickup device 17 includes an optical pickup 25 and a pickup shifting motor 26. The disc drive motor 15 drives the disc turntable 16 so that a CD 18 set to be reproduced by the CD reproducing mechanism section 12, is driven at the CLV speed, as described later. The optical pickup 25 of the pickup device 17 is constituted in the conventional three beam type pickup. Thus, the optical pickup 25 outputs a pair of RF signals Srf1 and Srf2.

The clock generator 13a comprises a quartz oscillator 27 and an oscillation circuit 28, as conventional clock generators. The oscillation circuit 28 of the clock generator 13a generates a system clock pulse Pck. The system clock pulse Pck varies between a first system clock pulse Pck1 and a second system clock pulse Pck2 in response to a reproduction speed control signal Sr applied form the reproducing speed control circuit 22a. The first system clock pulse Pck1 has a frequency Fck1 two times faster than the frequency Fck of the clock pulse Pck used in the conventional CD reproduction system (see FIG. 1). Thus, a frequency Fck2 of the second system clock pulse Pck2 is the same as the frequency Fck of the clock pulse Pck used in the conventional CD reproduction system. The frequency Fck1 is represented by the equation:

$$Fck1 = 2 \cdot Fck2 = 2 \cdot Fck.$$

The oscillation frequency of the oscillation circuit 28 is controlled by the reproducing speed control circuit 22a, as described above. For example, the reproducing speed control circuit 22a supplies the oscillation circuit 28 with a reproduction speed control signal Srh of high level state or another reproduction speed control signal Srl of low level state. The high level reproduction speed control signal Srh and the low level reproduction speed control signal Srl output from the reproducing speed control circuit 22a are selected by a prescribed dubbing speed selection key (not shown) equipped to the CD player 10. When a standard speed dubbing mode is selected by the dubbing speed selection key, the reproducing speed control circuit 22a supplies the oscillation circuit 28 with the low level reproduction speed control signal Srl. As a result, the oscillation circuit 28 outputs the second system clock pulse Pck2. When a fast speed dubbing mode is selected by the dubbing speed selection key, the reproducing speed control circuit 22a supplies the oscillation circuit 28 with the high level reproduction speed control signal Srh. As a result, the oscillation circuit 28 outputs the first system clock pulse Pck1.

The pair of RF signals Srf1 and Srf2 output from the optical pickup 25 are applied to an analog amplifier circuit 29 of the pickup signal processing circuit 23. The analog amplifier circuit 29 comprises a pair of current-voltage conversion amplifiers 30 and 31 and an RF signal amplifier circuit 32. The RF signals Srf1 and Srf2 are applied to the current-voltage converters 30 and 31, respectively. The outputs of the current-voltage converters 30 and 31 are combined together and then applied to the broad band RF signal amplifier circuit 32. The RF signal amplifier circuit 32 comprises an RF signal amplifier 33 and a feedback circuit 34. The feedback circuit 34 determines the frequency band characteristic of the RF signal amplifier circuit 32. Thus, the RF signals Srf1 and Srf2 are corrected to a suitable signal condition in the analog amplifier circuit 29. Thus, a corrected RF signal Srf is obtained.

The RF signal Srf is applied to the servo control circuit 14a. A data slice circuit (not shown) in the servo control circuit 14a slices the RF signal Srf at a prescribed threshold level so that the RF signal Srf is shaped to the original digital data DD. Further, the servo control circuit 14a generates a disc motor control signal Sdm and a pickup shifting motor control signal Spm according to a sub data component DDs, such as a control data in the digital data DD. The sub data component DDs will be referred to as a digital sub data hereafter.

The disc motor control signal Sdm is supplied to the disc drive motor 15 through a disc motor drive circuit 35. The disc motor drive circuit 35 comprises a disc motor drive amplifier 36 and a feedback circuit 37. The feedback circuit 37 defines the response characteristics of the disc motor control signal Sdm. Thus, the rotation speed of the disc drive motor 15 for rotating the CD 18 is suitably controlled by the disc motor control signal Sdm. The pickup shifting motor control signal Spm is supplied to the pickup shifting motor 26 through a pickup shifting motor drive circuit 38. The pickup shifting motor drive circuit 38 comprises a pickup shifting motor drive amplifier 39 and a feedback circuit 40. The feedback circuit 40 defines the response characteristics of the pickup shifting motor control signal Spm. Thus, the rotation speed of the pickup shifting motor 26 for shifting the optical pickup 25 is suitably controlled by the pickup shifting motor control signal Spm. The response characteristics of the pickup shifting motor control signal Spm may be relatively loose so that the feedback circuit 40 can be taken out from the pickup shifting motor drive circuit 38.

The analog amplifier circuit 29 further includes a conventional tracking error detection circuit and a conventional focus error detection circuit (both not shown). The tracking error detection circuit and the focus error detection circuit generate a tracking error signal Ste and a focus error signal Sfe according to the first and second RF signals Srf1 and Srf2, respectively.

The tracking error signal Ste is supplied to an objective lens (not shown) in the optical pickup 25 through a tracking actuator drive circuit 41. The tracking actuator drive circuit 41 comprises a tracking actuator drive amplifier 42 and a feedback circuit 43. The feedback circuit 43 defines the response characteristics of the tracking error signal Ste. Thus, a tracking servo control for the objective lens in the optical pickup 25 is suitably carried out by the tracking error signal Ste.

The focus error signal Sfe is supplied to the objective lens in the optical pickup 25 through a focus actuator drive circuit 44. The focus actuator driver circuit 44 comprises a focus actuator drive amplifier 45 and a feedback circuit 46. The feedback circuit 46 defines the response characteristics of the focus error signal Sfe. Thus, a focus servo control for the objective lens in the optical pickup 25 is suitably carried out by the focus error signal Sfe.

The servo control circuit 14a applies the digital sub data DDs to a phase locked loop circuit (referred to as PLL circuit hereafter) 47. The PLL circuit 47 generates a bit synchronous clock Sbs·ck according to the digital sub data DDs. The bit synchronous clock Sbs·ck is fed back to the servo control circuit 14a. The servo control circuit 14a then generates a data sampling clock Sds·ck according to the bit synchronous clock Sbs·ck. The data sampling clock Sds·ck is applied to the digital signal processor 14b together with a main data component DDm, such as a record data to be reproduced in the digital data DD. The main data component DDm will be referred to as a digital main data hereafter.

The digital signal processor 14b carries out some kind of digital operations on the digital main data DDm, such as a data error correction and a jitter absorption. The digital operation is carried out in synchronism with the system clock pulse Pck output from the clock generator 13a. A RAM (Random Access Memory) 48 is coupled to the digital signal processor 14b for temporarily storing the digital main data DDm in the digital operations. An output of the digital signal processor 14b, i.e., a corrected digital main data DDm is applied to the D/A conversion circuit 14c.

The D/A conversion circuit 14c converts the digital main data DDm to corresponding two analog signals, e.g., an L channel audio signal Al and an R channel audio signal Ar. The L and R channel audio signals Al and Ar are applied to L and R channel output terminals 49 and 50 through L and R channel audio amplifiers 51 and 52, respectively.

The reproducing speed control circuit 22a supplies the oscillation circuit 28 with the high level reproduction speed control signal Srh or the low level reproduction speed control signal Srl in response to the selection operation of the dubbing speed selection key, as described above. The high level reproduction speed control signal Srh or the low level reproduction speed control signal Srl is applied not only to the oscillation circuit 28, but also to the PLL circuit 47 and the feedback circuits 34, 37, 40, 43 and 46.

The oscillation circuit 28 outputs the second system clock pulse Pck2 or the first system clock pulse Pck1 in response to the low level reproduction speed control signal Srl or the high level reproduction speed control signal Srh. The PLL circuit 47 generates the bit synchronous clock Sbs·ck according to the digital sub data DDs, as described before. However, the bit rate of the bit synchronous clock Sbs·ck varies in response to the reproduction speed control signal Sr applied thereto, i.e., in response to the low level reproduction speed control signal Srl or the high level reproduction speed control signal Srh.

The bit rate of the bit synchronous clock Sbs·ck presents a standard bit rate when the low level reproduction speed control signal Srl is applied. The bit synchronous clock Sbs·ck with the standard bit rate is applied to the servo control circuit 14a. Thus, the servo control circuit 14a outputs the digital main data DDm, the data sampling clock Sds·ck, the disc motor control signal Sdm and the pickup shifting motor control signal Spm processed suitably for the standard speed reproduction.

The bit rate of the bit synchronous clock Sbs·ck presents a fast bit rate when the high level reproduction speed control signal Srh is applied. The fast bit rate is two times faster than the standard bit rate. The bit synchronous clock Sbs·ck with the fast bit rate is applied to the servo control circuit 14a. Thus, the servo control circuit 14a outputs the digital main data DDm, the data sampling clock Sds·ck, the disc motor control signal Sdm and the pickup shifting motor control signal Spm processed suitably for the fast speed reproduction.

The feedback circuits 34, 37, 40, 43 and 46 are controlled by their time constants by the reproduction speed control signal Sr applied from the servo control circuit 14a. That is, the feedback circuits 34, 37, 40, 43 and 46 present their first time constants suitable for the standard speed reproduction when the low level reproduction speed control signal Srl is applied. The feedback circuits 34, 37, 40, 43 and 46 present their second time constants suitable for the fast speed reproduction when the high level reproduction speed control signal Srh is applied. Thus, each of the RF signal amplifier circuit 32, the disc motor drive circuit 35, the pickup shifting motor drive circuit 38, the tracking actuator drive circuit 41 and the focus actuator drive circuit 44 operates at a different response characteristics suitable for the standard speed reproduction or the fast speed reproduction.

As a result, the L and R channel audio signals Al and Ar obtained from the D/A conversion circuit 14c are processed in response to the first and second system clock pulses Pck1 and Pck2, respectively. Thus, first L and R channel audio signals Al1 and Ar1 processed in response to the first system clock pulse Pck1 or second L and R channel audio signals Al2 and Ar2 processed in response to the second system clock pulse Pck2 are selectively output from the CD player 10 through the L and R channel output terminals 49 and 50.

The first L and R channel audio signals Al1 and Ar1 have a frequency band two times wider than the frequency band of the second L and R channel audio signals Al2 and Ar2, but the L and R channel audio signals Al1 and Ar1 are shorter by a half than the second L and R channel audio signals Al2 and Ar2.

The first L and R channel audio signals Al1 and Ar1 or the second L and R channel audio signals Al2 and Ar2 are applied to the cassette tape recorder 11. Further, the system clock pulse Pck, i.e., the first system clock pulse Pck1 or the second system clock pulse Pck2 output from the oscillation circuit 28 is supplied to the synchronous control circuit 24 through the digital signal processor 14b.

The synchronous control circuit 24 supplies a first synchronous signal Sy1 or a second synchronous signal Sy2 to the cassette tape recorder 11 in response to the first system clock pulse Pck1 or the second system clock pulse Pck2. The cassette tape recorder 11 operates in synchronism with the first synchrounous signal Sy1 or the second synchronous signal Sy2. Thus, a dubbing from the CD player 10 to the cassette tape recorder 11 is carried out. A tape speed of the cassette tape recorder 11 in the recording operation varies between a standard recording speed and a fast recording speed in response to the first synchronous signal Sy1 or the second synchronous signal Sy2. The standard recording speed corresponds to the standard reproducing speed of the CD player 10. The fast recording speed is two times faster than the standard recording speed and corresponds to the fast reproducing speed of the CD player 10.

Thus, when the standard speed dubbing mode is selected by the dubbing speed selection key, the CD player 10 and the cassette tape recorder 11 are operated at the standard reproducing speed and the standard recording speed in synchronism with each other. When the fast speed dubbing mode is selected by the dubbing speed selection key, the CD player 10 and the cassette tape recorder 11 are operated at the fast reproducing speed and the fast recording speed in synchronous with each other.

The reproducing speed control circuit 22a also outputs display signals for indicating operating states of the CD player 10, time, etc. The display signals are displayed by a display circuit 53.

Figure 5:
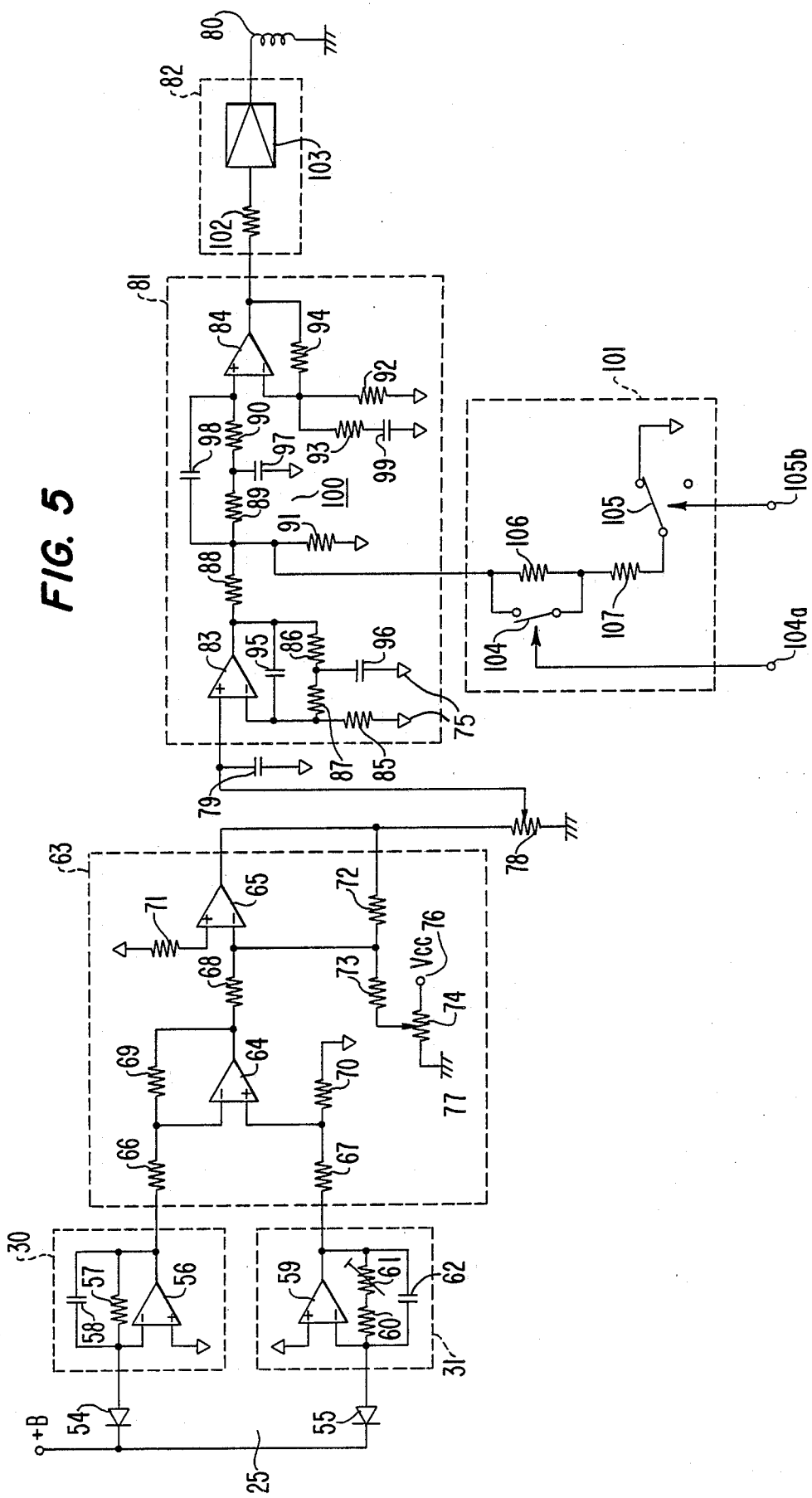
FIG. 5 is a circuit diagram showing the tracking servo control portion of FIG. 4.

Referring now to FIG. 5, an actual circuit configuration for the tracking servo control according to the present invention will be described. In FIG. 5, the optical pickup 25 of the conventional three beam type optical pickup comprises a pair of photodiodes 54 and 55. The three beam type optical pickup radiates a main light beam and a pair of sub light beams. The main light beam is radiated to the center of a track of the CD 18 for reading optical information recorded on the track. The sub light beams are radiated to both ends of the track for obtaining a tracking error information.

The photodiodes 54 and 55 are provided for receiving the sub light beams, respectively. For example, an output current from the photodiode 54, i.e., the above-mentioned RF signal Srf1 is supplied to the current-voltage converter 30.

An output current from the photodiode 55, i.e., the abovementioned RF signal Srf2 is supplied to the current-voltage converter 31. The current-voltage converter 30 comprises an operational amplifier 56, a resistor 57 and a capacitor 58. The current-voltage converter 55 comprises an operational amplifier 59, a resistor 60, a variable resistor 61 and a capacitor 62.

The RF signals Srf1 and Srf2 are applied to a tracking error detection circuit 63. The tracking error detection circuit 63 comprises a pair of operational amplifiers 64 and 65, a plurality of resistors 66 to 73 and a variable resistor 74.

The RF signals Srf1 and Srf2 are input to the inverted input terminal and the non-inverted input terminal of the operational amplifier 64 through the resistors 66 and 67. Thus, the operational amplifier 64 carries out a subtraction between the RF signals Srf1 and Srf2. The substraction signal output from the operational amplifier 64 is applied to the operational amplifier 65 through the resistor 68. The resistor 69 is coupled between the output terminal and the inverted input terminal of the operational amplifier 64 for signal feedback operation. The resistor 70 is coupled between a bias source 75 and the non-inverted input terminal of the operational amplifier 64 for receiving a bias voltage.

The subtraction signal is applied to the inverted input terminal of the operational amplifier 65. The non-inverted input terminal of the operational amplifier 65 is coupled to the bias source 75 through the resistor 71. The resistor 72 is coupled between the output terminal and the inverted input terminal of the operational amplifier 65 for signal feedback operation. Further, the variable resistor 74 is coupled between a power supply source 76 and a ground potential source 77. The resistor 73 is coupled between the non-inverted input terminal of the operational amplifier 65 and the variable output terminal of the variable resistor 74 for receiving an adjusted bias voltage.

The output of the tracking error detection circuit 63, i.e., a tracking error signal Ste is obtained through a variable resistor 78 coupled between the output terminal of the operational amplifier 65 and the ground potential source 77. The variable resistor 78 adjusts the level of the tracking error signal Ste. The tracking error signal Ste thus level adjusted has undesired high frequency components removed by a capacitor 79 coupled between the output terminal of the variable resistor 78 and the bias source 75.

Then, the tracking error signal Ste is applied to a tracking actuator coil 80 through a phase compensation circuit 81 and an tracking actuator drive circuit 82. The phase compensation circuit 81, the tracking actuator drive circuit 82 and a response characteristics switching circuit 101, as described later, constitute corresponding circuits in the tracking actuator drive circuit 41 of FIG. 4.

The tracking actuator coil 80 is provided in the optical pickup 25 for shifting the objective lens in the perpendicular direction of the track of the CD 18.

The phase compensation circuit 81 comprises a pair of operational amplifiers 83 and 84, a plurality of resistors 85 to 94 and a plurality of capacitors 95 to 99. The tracking error signal Ste is applied to the non-inverted input terminal of the operational amplifier 83. The inverted input terminal of the operational amplifier 83 is coupled to the bias source 75 through the resistor 85. The resistors 86 and 87 are coupled in series between the output terminal and the inverted input terminal of the operational amplifier 83 for signal feedback operation. Further, the capacitor 95 is coupled in parallel with the series circuit of the resistors 86 and 87, i.e., between the output terminal and the inverted input terminal of the operational amplifier 83. The connection node between the resistors 86 and 87 is coupled to the bias source 75 through the capacitor 96.

The output of the operational amplifier 83 is applied to a gain control circuit 100 through the resistor 88. The gain control circuit 100 comprises the resistors 89, 90 and 91 and the capacitors 97 and 98. The resistors 89 and 90 are coupled in series between the input end and the output end of the gain control circuit 100. The connection node between the resistors 89 and 90 is coupled to the bias source 75 through the capacitor 97. The capacitor 98 is coupled in parallel with the series circuit of the resistors 89 and 90, i.e., between the input end and the output end of the gain control circuit 100. The input end of the gain control circuit 100 is coupled to the bias source 75 through the resistor 91. Further the input end is coupled to a response characteristics switching circuit 101 as described later. The tracking error signal Ste thus compensated in phase by the gain control circuit 100 is applied to the operational amplifier 84.

The tracking error signal Ste is applied to the non-inverted input terminal of the operational amplifier 84. The inverted input terminal of the operational amplifier 84 is coupled to the bias source 75 through the resistor 92. Further, the inverted input terminal of the operational amplifier 84 is coupled to the bias source 75 through the resistor 93 and the capacitor 99 connected in series. The resistor 94 is coupled between the output terminal and the inverted input terminal of the operational amplifier 84 for the signal feedback operation.

The tracking error signal Ste thus compensated in phase by the phase compensation circuit 81 is applied to the tracking actuator drive circuit 82. The tracking actuator drive circuit 82 comprises a resistor 102 and a power amplifier 103 connected in series.

The response characteristics switching circuit 101 comprises a pair of switches, i.e., first and second switches 104 and 105 and a pair of resistors 106 and 107. The first and second switches 104 and 105 are coupled in series between the input end of the gain control circuit 100 of the phase compensation circuit 81 and the bias source 75.

The resistor 106 is coupled in parallel with the first switch 104. The resistor 107 is coupled between the first and second switches 104 and 105.

The control terminal 104a of the first switch 104 is provided to respond to the reproduction speed control signal Sr, i.e., the low and high level reproduction speed control signals Srl and Srh output from the reproducing speed control circuit 22a (see FIG. 4). Thus, the first switch 104 is turned ON or OFF in response to the low level reproduction speed control signal Srl or the high level reproduction speed control signal Srh. The second switch 105 is kept in ON state for both the low and high level reproduction speed control signals Srl and Srh. As a result, the bias voltage is applied to the gain control circuit 100 through the second switch 105, the resistor 107 and the first switch 104, but bypassing the resistor 106 when the standard speed dubbing is selected. While, the bias voltage is applied to the gain control circuit 100 through the second switch 105, the resistor 107 and the resistor 106 when the fast speed dubbing is selected.

The response characteristics switching circuit 101 controls the level of the bias voltage to be applied to the gain control circuit 100 in response to the standard speed dubbing of the fast speed dubbing. That is, a high level bias voltage is applied to the gain control circuit 100 when the standard speed dubbing is selected. While, a low level bias voltage is applied to the gain control circuit 100 when the fast speed dubbing is selected. Thus, the gain of the tracking error signal Ste applied to the tracking actuator coil 80 is controlled by the gain control circuit 100.

Figure 6:
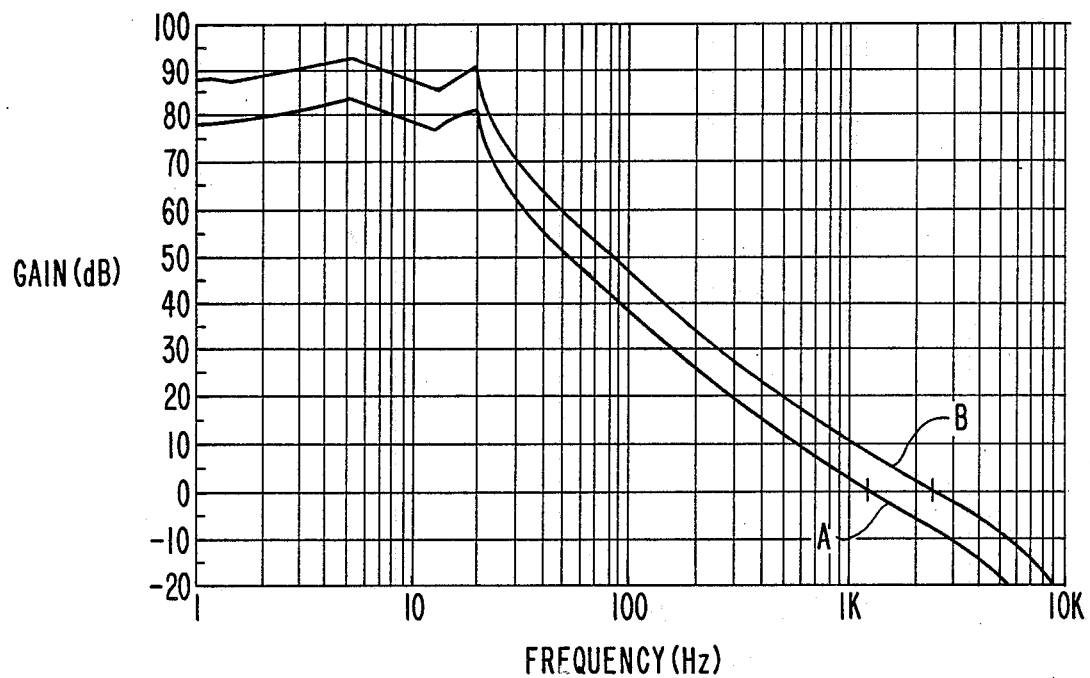
FIG. 6 is a graph showing the gain response characteristics of the tracking error signal Ste in the embodiment of FIG. 5.

Referring now to FIG. 6, the gain response characteristics of the tracking error signal Ste will be described. The high level bias voltage is applied to the gain control circuit 100 when the standard speed dubbing is selected, as described above. In this case, the tracking error signal Ste has the gain response as shown by the graph A in FIG. 6. The low level bias voltage is applied to the gain control circuit 100 when the fast speed dubbing is selected, as described above. In this case, the tracking error signal Ste has the gain response as shown by the graph B in FIG. 6. The gain response characteristics B at the fast speed dubbing is higher than the gain response characteristics A at the standard speed dubbing for the entire frequency band of the phase compensation circuit 81.

In the fast speed dubbing or reproduction, the CD 18 and the optical pickup 25 are driven at the fast speed. Thus, the CD 18 and the optical pickup 25 more easily to receive disturbances than in the standard speed dubbing or reproduction. However, the tracking error signal Ste has the high level gain response characteristics as shown by the graph B in the fast speed dubbing or reproduction. Then, the optical pickup 25 is servo controlled with the sufficient gain response.

According to the embodiment, the gain of the tracking error signal Ste varies in response to the standard speed reproduction or the fast speed reproduction. As a result, the tracking servo control on the optical pickup 25 is carried out at their optimum states. If the gain response characteristics of the tracking servo control is fixed to the low gain state of the standard speed reproduction, as shown by the graph A in FIG. 6, the tracking actuator drive circuit 41 (see FIG. 4) fails to servo control the objective lens of the optical pickup 25. Accordingly, it is effective to increase the gain of the phase compensation circuit 81 (see FIG. 5) or the tracking actuator drive circuit 41 (see FIG. 4) in the fast speed reproduction.

On the other hand, if the gain response characteristics of the tracking error signal Ste is fixed to the high gain state of the fast speed reproduction, as shown by the graph B in FIG. 6, the optical pickup 25 is easily disturbed by faults on the track of the CD 18, such as soils, dusts or scratches in the standard speed reproduction. Accordingly, it is effective to reduce the gain of the phase compensation circuit 81 (see FIG. 5) or the tracking actuator drive circuit 41 (see FIG. 4) in the standard speed reproduction.

According to the above construction, the response characteristics of the tracking servo control varies in response to the standard speed reproduction and the fast speed reproduction. As a result, the present invention can provide a tracking control circuit for disc players which is able to obtain precise reproducing signals at any time both at reproduction at the standard speed and at reproduction at the quicker speed than the standard.

The second switch 105 is kept in the ON state for both the low and high level reproduction speed control signals Srl and Srh, as described before. The control terminal 105a of the second switch 105 is however operated in response to a search operation. Thus, the second switch 105 is turned OFF, when a search operation is commanded to the CD player 10 by a suitable operation key. Then, the gain control circuit 100 is deactivated, since the bias voltage fails to be supplied thereto. In the search operation, the optical pickup 25 is shifted in the radial direction of the CD 18 at a relatively high speed so that the optical pickup 25 crosses the tracks. Thus, the tracking servo control is stopped.

Figure 7:
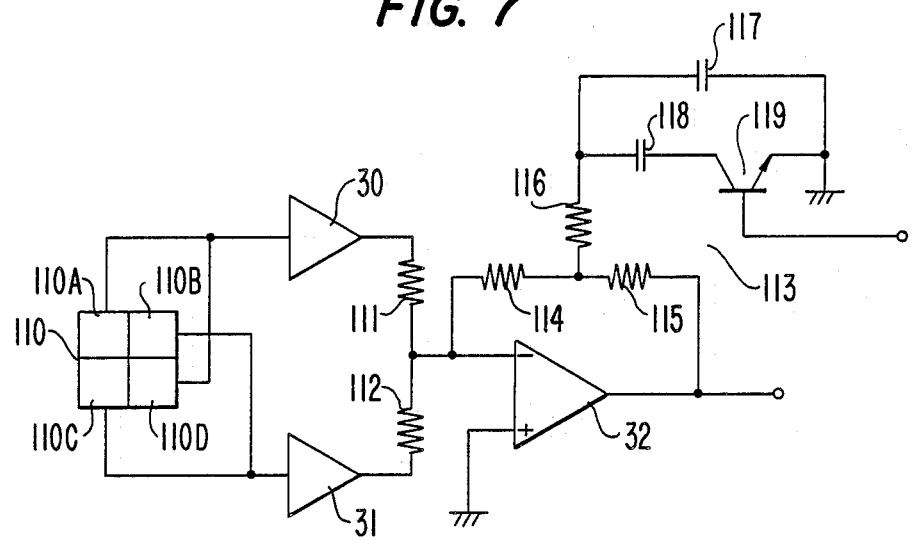
FIG. 7 is a circuit diagram showing the RF signal amplifying portion of FIG. 4.

Referring now to FIG. 7, an actual circuit configuration for the analog amplifier circuit 29 of FIG. 4 will be described. In FIG. 7, a diagonally split photo detector 110 is provided in an optical pickup, such as the optical pickup 25 of FIG. 4. The diagonally split photo detector 110 comprises four photodiodes 110A, 110B, 110C and 100D. A pair of the photodiodes, i.e., 110A and 110D are arranged in diagonal. Another pair of the photodiodes, i.e., 110B and 110C are arranged in diagonal. Detection signals of the former pair of the photodiodes 110A and 110D are combined together and then applied to a current-voltage converter 30. Detection signals of the latter pair of the photodiodes 110B and 110C are combined together and then applied to a current-voltage converter 31. Both outputs of the current-voltage converters 30 and 31 are again combined together through resistors 111 and 112, respectively. Thus, an RF signal Srf is obtained. The RF signal Srf is applied to an RF signal amplifier circuit 32.

The RF signal Srf is applied to the inverted input terminal of the RF signal amplifier circuit 32. The non-inverted input terminal of the RF signal amplifier circuit 32 is coupled to a ground potential source. A frequency band switchable feedback circuit 113 is coupled between the output terminal and the inverted input terminal of the RF signal amplifier circuit 32 for signal feedback operation. The frequency band switchable feedback circuit 113 comprises three resistors 114, 115 and 116, a pair of two capacitors 117 and 118 and a transistor 119. The resistors 114 and 115 are coupled in series between the output terminal and the inverted input terminal of the RF signal amplifier circuit 32. The resistor 116 and the capacitor 117 are coupled in series between a ground potential source and the connection node of the resistors 114 and 115. The capacitor 118 and the transistor 119 are coupled in series between the resistor 116 and the ground potential source. Thus, the series circuit of the capacitor 118 and the transistor 119 is coupled in parallel with the capacitor 117. The base terminal of the transistor 119 is provided for coupling to the reproducing speed control circuit 22a of FIG. 4. Thus, the reproduction speed control signal Sr, i.e., the high level reproduction speed control signal Srh or the low level reproduction speed control signal Srl is applied to the frequency band switchable feedback circuit 113.

The frequency band switchable feedback circuit 113 provides a prescribed low pass filtering characteristics to the RF signal amplifier circuit 32. The cutoff frequency of the low pass filtering characteristics is defined by the time constant of the frequency band switchable feedback circuit 113.

In the embodiment of FIG. 7, the high level reproduction speed control signal Srh is produced in the standard speed reproduction, while the low level reproduction speed control signal Srl is produced in the fast speed reproduction. The transistor 110 is activated in response to the high level reproduction speed control signal Srh. Thus, the capacitor 118 is effective in the frequency band switchable feedback circuit 113, as well as the capacitor 117. Then, the capacitance element defining the time constant of the frequency band switchable feedback circuit 113 at the standard speed reproduction is given by both the capacitors 117 and 118. The capacitor 118 is ineffective in the frequency band switchable feedback circuit 113, when the transistor 119 is deactivated in response to the low level reproduction speed control signal Srl. Then, the capacitance element defining the time constant of the frequency band switchable feedback circuit 113 at the fast speed reproduction is given by the capacitor 117 only.

Figure 8:
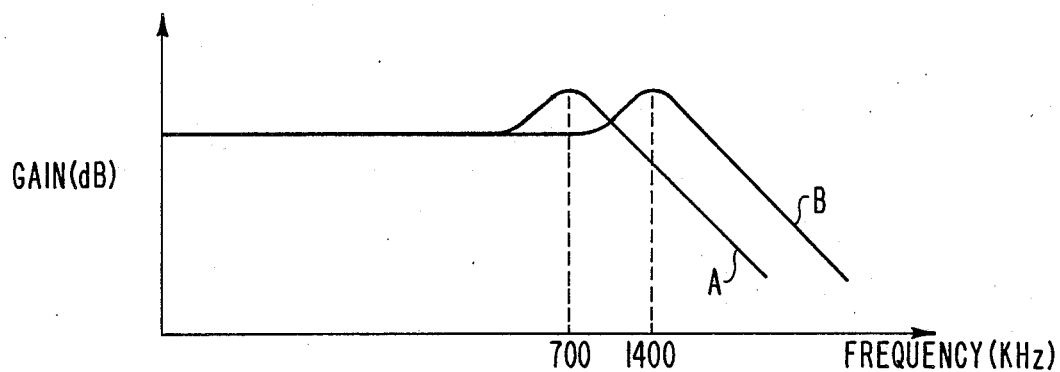
FIG. 8 is a graph showing the frequency band characteristics of the RF signal amplifier of FIG. 7.

FIG. 8 shows the frequency response characteristics of the RF signal amplifier circuit 32 due to the frequency band switchable feedback circuit 113. As described above, the time constant at the standard speed reproduction is relatively large since the parallel coupling of the capacitors 117 and 118 gives a large capacitance. Thus, the cutoff frequency of the low pass filtering characteristics for the standard speed reproduction is lowered as shown by the graph A in FIG. 8. The time constant at the fast speed reproduction is relatively small since the capacitor 117 gives a small capacitance. Thus, the cutoff frequency of the low pass filtering characteristics for the fast speed reproduction is raised as shown by the graph B in FIG. 8. For example, the low pass filtering characteristics of the graph A has the cutoff frequency of about 700 KHz. The low pass filtering characteristics of the graph B has the cutoff frequency of about 1400 KHz.

As shown in FIG. 8, the frequency band characteristics of the RF RF signal amplifier 32 varies between the narrow band state (graph A) and the wide band state (graph B) in response to the standard speed reproduction and the fast speed reproduction.

In the standard speed reproduction, undesired higher frequency signals over the cutoff frequency, i.e., about 700 KHz are attenuated. Thus, the RF signal having the narrow frequency band characteristics (graph A) suitable for the standard speed reproduction is obtained by the RF signal amplifier 32. In the fast speed reproduction, the RF signal read out at the fast speed has the frequency band two times wider than the frequency band at the standard speed. Thus, the RF signal having the wide frequency band characteristics (graph B) suitable for the fast speed reproduction is obtained by the RF signal amplifier 32.

Therefore, according to the constitution of the RF signal amplifier 32 as shown in FIG. 8, the frequency band characteristic thereof is changed in response to the reproduction speed of the CD 18. As a result, the vary optimum RF signals can be obtained either at the standard speed reproduction and the fast speed reproduction.

If the frequency band characteristic of the RF amplifier circuit 32 is fixed to the state (graph A) suitable for the standard speed reproduction, the RF signal obtained in the fast speed reproduction loses the higher frequency components of the original analog signal corresponding to the digital signal recorded on the CD 18.

If the frequency band characteristics of the RF amplifier circuit 32 is fixed to the state (graph B) suitable for the fast speed reproduction, the RF signal obtained in the standard speed reproduction includes undesired high frequency signals other than the original analog signal corresponding to the digital signal recorded on the CD 18.

As described above, the present invention can provide an extremely preferable digital disc reproduction system.

While there has been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example for the purposes of a divisional application.

What is claimed is:

1. A digital disc reproduction system comprising:
   disc reproducing means for driving a disc and reading information from the disc;
   signal processing means for processing the information read from the disc by the disc reproducing means to obtain signals and for supplying control signals to the disc reproducing means in order to servo control the disc reproducing means;
   clock generator means for generating a plurality of different frequency clocks; and
   means for selecting and supplying one of the different frequency clocks to the signal processing means; and wherein
   the signal processing means includes a signal amplifier means for amplifying signals obtained by the disc reproducing means, said signal amplifier means including feedback circuit means for determining the frequency band characteristic of said signal amplifier means with the selected clock generated by the clock generator means.

2. A digital disc reproduction system according to claim 1 wherein the clock generator means includes a clock generator for generating a predetermined frequency clock and a frequency divider for dividing the frequency of the predetermined frequency clock.

3. A digital disc reproduction system according to claim 2 further comprising a recording means for recording signals obtained by the signal processing means.

4. A digital disc reproduction system according to claim 3 further including a synchronizing means for operating the recording means in synchronism with the selected clock generated by the clock generator means.

5. A digital disc reproduction system according to claim 1 wherein the disc reproducing means includes pickup means, the signal processing means includes a tracking servo control means for controlling the pickup means of the disc reproducing means, and the response characteristics of the tracking servo control means are controlled with the selected clock generated by the clock generator means.

6. A digital disc reproduction system according to claim 1 wherein said feedback circuit means determines the time constant of said amplifier means in accordance with the selected clock generated by the clock generator means.

* * * * *

UNITED STATES PATENT AND TRADEMARK OFFICE
CERTIFICATE OF CORRECTION

PATENT NO. : 4,964,109

DATED : October 16, 1990

INVENTOR(S) : Yo Yoshioka

It is certified that error appears in the above-identified patent and that said Letters Patent is hereby corrected as shown below:

Column 10, Line 25, change "substraction" to --subtraction--;

Column 12, Line 35, delete [to];

Column 13, Line 24, change "100D" to --110D--.

Signed and Sealed this

Ninth Day of March, 1993

Attest:

STEPHEN G. KUNIN

*Attesting Officer*   Acting Commissioner of Patents and Trademarks